Feb. 22, 1927.  
E. E. BARTLETT  
1,618,747  
MAKING BLOWN GLASS ARTICLES  
Filed March 4, 1926   2 Sheets-Sheet 1
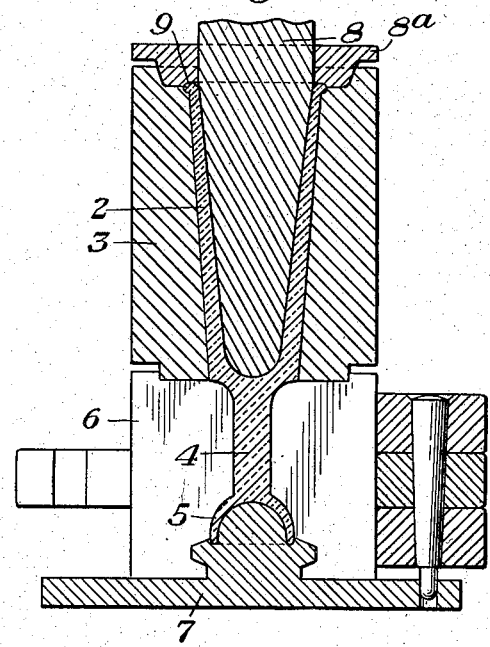
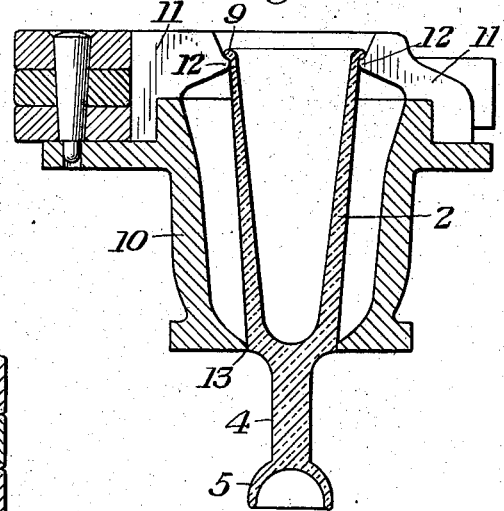
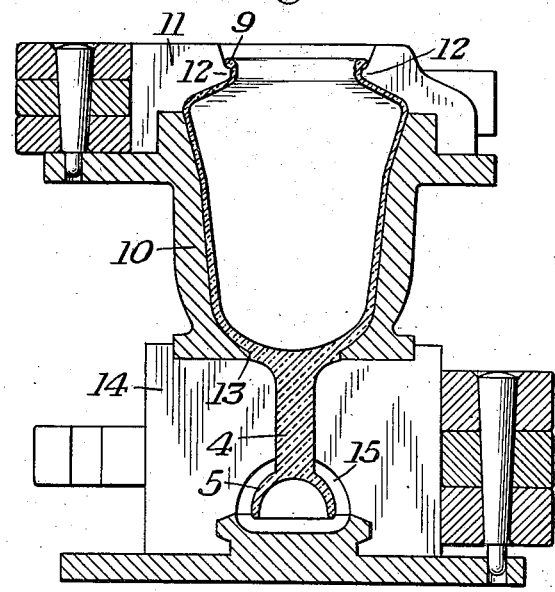
INVENTOR  
Edward E. Bartlett  
by his attorneys  
Byrne, Stebbins & Parmelee INVENTOR
Edward E. Bartlett
by his attorneys
Byrnes, Stebbins & Parmelee Patented Feb. 22, 1927.

1,618,747

UNITED STATES PATENT OFFICE.

EDWARD E. BARTLETT, OF SAPULPA, OKLAHOMA.

MAKING BLOWN-GLASS ARTICLES.

Application filed March 4, 1926. Serial No. 92,165.

This invention relates to the making of blown glass articles, and particularly to blown glass articles having an appended portion, as, for example, a goblet which consists of a blown bowl having an appended stem and foot.

Considerable difficulty has heretofore been experienced in producing satisfactory goblets, because of the necessity of using a two-part blow mold in order to permit removal of the blown article therefrom. The mold leaves a mark on the article which materially reduces its quality.

I provide for placing a blank in a one-piece mold having an opening of sufficient size to permit passage of the appended portion of the article therethrough, blowing the article in the mold, and withdrawing the blown article from the mold, the appended portion being withdrawn through such opening. Preferably, the opening is substantially closed off for the blowing operation, as by using a two-part mold or mold closure. This does not materially affect the quality of the product and it simplifies the blowing operation.

The appended portion may be attached either before the blowing operation proper, or during such operation. It is preferred, however, in the manufacture of a goblet to form a parison having a foot and stem portion integral with the bowl portion but having the foot unopened. The parison is transferred to a blow mold having an opening through which the foot and stem project, and the bowl is blown. The article is then withdrawn from the blow mold and the foot is opened.

In a modified form of my invention the foot and stem are separately formed and are mounted in a fixed relation with the blow mold. The bowl is then blown and is caused to adhere to the foot and stem, after which the entire article is removed from the blow mold, the foot and stem being withdrawn through the opening.

In the accompanying drawings, which illustrate more or less diagrammatically a preferred manner of carrying out my invention and certain modifications,—

Figure 1 is a vertical section through a parison mold in which a blank is formed;

Figure 2 is a similar section through a blow mold showing the parison transferred thereto but still unblown;

Figure 3 is a similar view but showing the bowl of the goblet blown;

Figure 4:
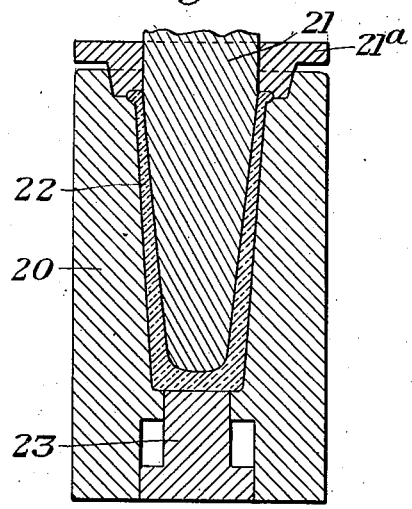
Figure 4 is a view similar to Figure 1 but showing a modified form of parison.

Referring to Figures 1 to 3, inclusive, there is shown in Figure 1 a mold for pressing a parison having a foot and stem unitary with the bowl forming portion. The bowl forming portion 2 is pressed in a one-piece mold 3, while the stem 4 and foot 5 are formed in a two-part mold 6. The entire mold is set on a base 7. A plunger 8 and a ring 8$^a$ are provided for forming the parison. The parison is made with a supporting neck 9 as shown.

The parison is transferred to a blow mold, which consists of a one-piece body portion 10 having a two-part top portion 11. The top portion is provided with a lip 12 adapted to engage the neck 9 of the parison and support it in the mold in the position shown in Figure 2. It will be noted that the blow mold 10 has an opening 13 through which the stem and foot 4 and 5 project. Preferably, the foot 5 is left unopened, as shown in Figures 1 and 2, so that the opening 13 may be maintained at a minimum diameter.

The parison is blown to form a goblet bowl, as shown in Figure 3. If desired, air pressure may be applied to the bottom of the mold to prevent the parison blowing out through the opening 13, but preferably the glass is supported by substantially closing off the opening. This is shown in Figure 3. A two-part mold 14 is provided for this purpose, and it will be seen that it grips and holds the stem 4 and closes off the opening 13 to permit blowing of the parison to final shape. The mold 14 is provided with cavities 15 adapted to accommodate the foot 5.

After the article has been blown, as shown in Figure 3, the top mold 11 and the bottom mold 14 are opened and the blown article is withdrawn by lifting it upwardly. The foot and stem are withdrawn through the opening 13. The foot 5 is then opened, the top portion is cracked off and the edge finished. These last named operations may be carried out in any desired order, and the annealing may also be done at any desired stage, although it is generally done before cracking off.

Figure 5:
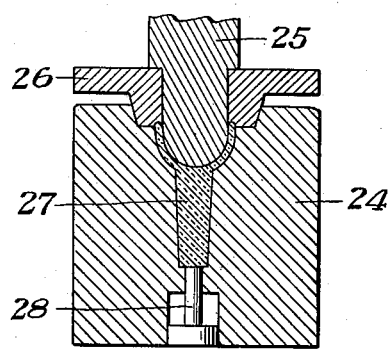
Figure 5 is a vertical section through a mold for pressing a stem and foot portion adapted to be used in connection with the parison of Figure 4.
Figure 6:
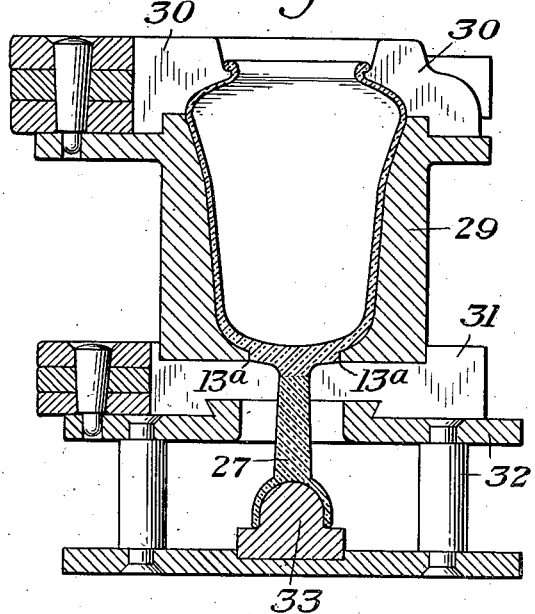
Figure 6 is a view similar to Figure 3 but showing the use of the parison and the stem and foot of Figures 4 and 5.

Referring now to Figures 4 to 6, inclusive, there is shown in Figure 4 a parison mold 20 having a plunger 21 and a ring 21ª for forming a parison 22 adapted to form the bowl portion of a goblet. A valve 23 is provided for ejecting the parison. In Figure 5 there is shown a one-piece mold 24 provided with a plunger 25 and a ring 26 for forming the foot and stem portion 27. A valve 28 is provided for ejecting the completed foot and stem portion.

The parison 22 is supported in the blow mold, shown in Figure 6, in a manner similar to the parison shown in Figure 2. The blow mold consists of a one-piece body portion 29 and a two-piece top portion 30. The one-piece mold 29 lies on top of a two-piece mold 31 adapted to close off the opening 13ª in the bottom of the one-piece mold 29. This mold engages the upper portion of the stem 27, as shown in the drawings. The mold 31 is supported on a jigger 32 provided with a plug 33 which supports the foot of the member 27.

When the parison 22 is blown, the lower portion thereof is forced downwardly into the two-part mold 31 and adheres to the foot-and-stem-forming portion 27. When the mold is opened and the goblet is withdrawn, the foot and stem are attached to the bowl and the subsequent finishing operations may be carried out as desired. This last described process is of advantage in that two kinds of glass may be used, one for the bowl and one for the foot and stem.

My invention permits the production of an article, such as a goblet, in which the blown portion shows no seams such as are produced in a two-part mold, thereby giving a high quality product at relatively low cost.

I have described a preferred manner of carrying out my invention, but it will be understood that it is not limited to such form, as it may be otherwise embodied within the scope of the following claims.

I claim:

1. The method of making blown glass articles having an appended portion with an enlargement thereon, which includes placing a blank in a one-piece mold which has an opening of sufficient size to permit passage of the appended portion and enlargement therethrough, blowing the article in the mold, and withdrawing the blown article from the mold, the appended portion and enlargement being withdrawn through such opening.

2. The method of making blown glass articles having an appended portion with an enlargement thereon, which includes placing a blank in a one-piece mold having an opening of sufficient size to permit projection of the appended portion and enlargement therethrough, substantially closing off the opening, blowing the article in the mold, and withdrawing the blown article from the mold, the appended portion and enlargement being withdrawn through such opening.

3. The method of making blown glass articles having an appended stem with an enlargement thereon, which includes placing a blank in a one-piece mold having an opening of sufficient size to permit passage of the enlargement therethrough, substantially closing off the opening and closely surrounding the stem, blowing the article in the mold, and withdrawing the blown article from the mold, the enlargement being withdrawn through such opening.

4. The method of making blown glass articles having an appended stem with an enlargement thereon, which includes placing a blank in a one-piece mold having an opening of sufficient size to permit passage of the enlargement therethrough, substantially closing off the opening and closely surrounding the stem, blowing the article in the mold, withdrawing the blown article from the mold, the enlargement being withdrawn through such opening, and reworking the enlargement.

5. The method of making blown glass articles having an appended stem with an enlargement thereon, which includes first forming a parison having a portion adapted to be blown and having an integral stem and an enlargement thereon, placing the parison in a one-piece mold having an opening of sufficient size to permit projection of the stem and the enlargement therefrom, blowing the article in the mold, and withdrawing the blown article from the mold, the enlargement being withdrawn through such opening.

6. The method of making blown glass articles having an appended stem with an enlargement thereon, which includes first forming a parison having a portion adapted to be blown and having an integral stem and an enlargement thereon, placing the parison in a one-piece mold having an opening of sufficient size to permit projection of the stem and the enlargement therefrom, closely surrounding the stem adjacent the mold to substantially close off such opening, blowing the article in the mold, and withdrawing the blown article from the mold, the enlargement being withdrawn through such opening.

7. Apparatus for making blown glass articles having an appended stem with an enlargement thereon, including a one-piece blow mold adapted to form the body of the article, a two-piece mold portion adapted to close off one end of the opening in the blow mold, the other opening of the blow mold being of sufficient size to permit projection of the appended portion therefrom, and means for surrounding the stem to substantially close off the last mentioned opening.

8. Apparatus for making blown glass articles having an appended portion with an enlargement thereon including a one-piece blow mold having an opening of sufficient size to permit passage of the appended portion and its enlargement therethrough and means for surrounding the projecting portion of the article when the article is positioned in the blow mold so as to substantially close off the opening during the blowing operation.

In testimony whereof I have hereunto set my hand.

EDWARD E. BARTLETT.